July 4, 1967 A. V. SPARR, SR 3,329,126
PORTABLE MILK TRANSFER SYSTEM
Filed Dec. 16, 1965 2 Sheets-Sheet 1

Anders V. Sparr, Sr.
INVENTOR.

BY Clarence A. O'Brien
and Harvey B. Jacobson
Attorneys

Anders V. Sparr, Sr.
INVENTOR.

United States Patent Office 3,329,126
Patented July 4, 1967

3,329,126
PORTABLE MILK TRANSFER SYSTEM
Anders V. Sparr, Sr., Rte. 2, Waupun, Wis. 53963
Filed Dec. 16, 1965, Ser. No. 514,183
8 Claims. (Cl. 119—14.11)

The present invention relates to milk handling systems, generally speaking, and has to do, more particularly, with portable attendant controlled milk collecting means capable of acceptable use within the confines of a stanchion barn wherein, and as is common, a centered aisle extends lengthwise between open-ended cow-containing stalls to the left and right, respectively, of the aisle.

Persons conversant with the art to which the invention relates are aware that it is common practice in the economical transfer of milk to employ a wheeled cart, vat or other suitable container which is moved progressively from stall to stall in a manner to permit milk-filled buckets from individual cows to be dumped into the receptacle portion of the vat. In keeping with prevailing practice, the milk is drawn through a plastic hose communicatively connected to the tank and which conveys the evacuated milk by way of a suitably long flexible hose line to the milk house, more particularly, the cooling tank or vat in the milk house. One object of the present concept is to advance this line of endeavor and to improve upon apparatus offered by others for systematically collecting as well as conducting milk from the barn area to the milk house.

Another object of the invention is to improve upon the milk pipe line system disclosed and claimed in Patent 3,016,877 granted to me on Jan. 16, 1962. To this end, the present concept has to do with safe and reliable structural means capable of drawing the milk directly out of a conventional milk bucket and transferring it through the medium of a motorized pump and flexible transparent hose line to the customarily used cooling tank in the milk house. This general concept is disclosed in a broadly similar manner in Patent 3,016,877 in that a conventional type milk bucket is utilized, there being a lid fitted airtight atop the bucket and equipped with a bucket emptying milk nipple. In the instant matter, which is an improvement upon my prior patent, a nipple-equipped lid or cover is also employed. However, the venting means is omitted and the lid rests slightly atop the neck of the bucket and allows air to enter the milk filled bucket in a manner to assist in evacuating the milk from the bucket then feeding it by way of a transparent hose line to the intake side of a pump. More particularly, novelty is predicated on a lid having a nipple which depends into the milk in the bucket so that when the pump is started, the milk is sucked into the pump, is passed by way of the pump into the delivery hose where it is conveyed to the cooling vat in the milk house.

One object of the present invention is to provide a simple and practical wheel-supported truck or cart which is capable of being pushed, pulled and otherwise maneuvered by a single hand. This cart is provided with a hollow housing which contains and confines a motor operated pump. The milk conveying or delivery hose is communicatively connected with the exhaust side of the centrifugal pump, is relatively long and, when it is not being used, it is coiled and wound around the housing. Accordingly, the housing is fashioned into a delivery hose winding and storing drum.

The invention also features a novel milk pick-up and feeding hose which is communicatively connected at one end with the intake side of the pump. This hose terminates at its intake end in the aforementioned nipple which is adapted to be inserted into the milk in the bucket and is an integral part of the bucket closing lid or cover. Also this hose, which is relatively short, serves the function of assisting in switching the motor off. To this end, a portion of the hose is passed between a window-equipped stationary photoelectric cell, and an opposed lamp bulb whose beam is focused on a photoelectric cell in line with said window. That portion of the hose which is here involved is provided with a short nontransparent sleeve which serves as a "blind" and assists in acting on the photoelectric cell to start the motor and coordinated pump when desired.

The over-all concept features a hollow housing which supports and encloses and shields the bulb and photoelectric cell switching means, and also encloses the self-priming pump and motor. The top wall of the housing serves as a platform or base on which the readily applicable and removable milk bucket is capable of being placed, in fact on an upstanding rim which functions to support the bucket in a tilted state to facilitate sucking or withdrawing the milk from the bucket and delivering it into the pump.

These together with other objects and advantages which will become subsequently apparent reside in the details of construction and operation as more fully hereinafter described and claimed, reference being had to the accompany drawings forming a part hereof, wherein like numerals refer to like parts throughout, and in which:

Figure 7:
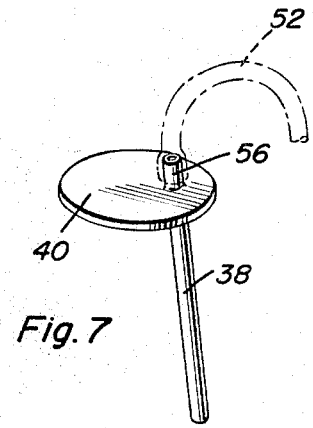

And FIG. 7 is a view in perspective of the milk bucket lid or cover and the attached depending angularly disposed milk sucking nipple.

Figure 1:
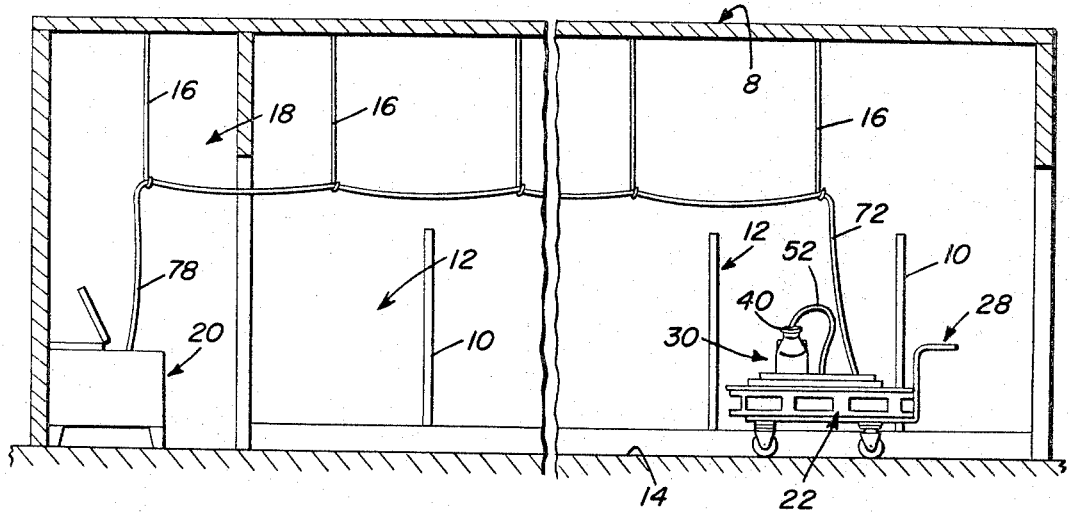
FIG. 1 is a view in section and elevation of a stanchion barn which shows, somewhat diagrammatically, a plurality of cow containing stalls, illustrates the aisle, the milk house, the cooling tank in the milk house and, what is more important, the walking attendant controlled and steered cart and the self-contained features which constitute the invention herein featured.
Figure 2:
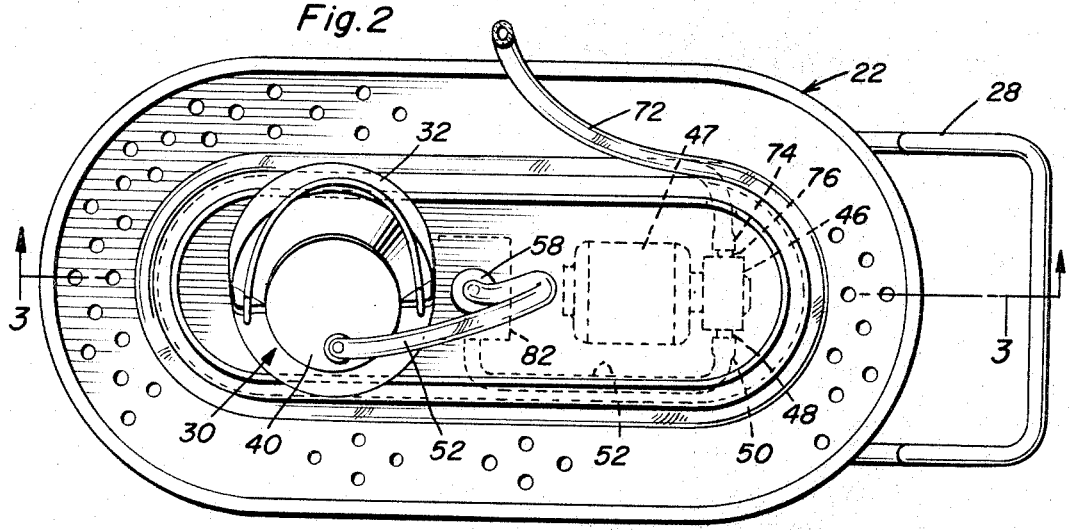
FIG. 2 is a top plan view of the cart showing the motor and pump and portions of the hoses in phantom lines and, more importantly, showing the conventional milk-laden bucket and how it is tilted for milk collecting purposes.
Figure 4:
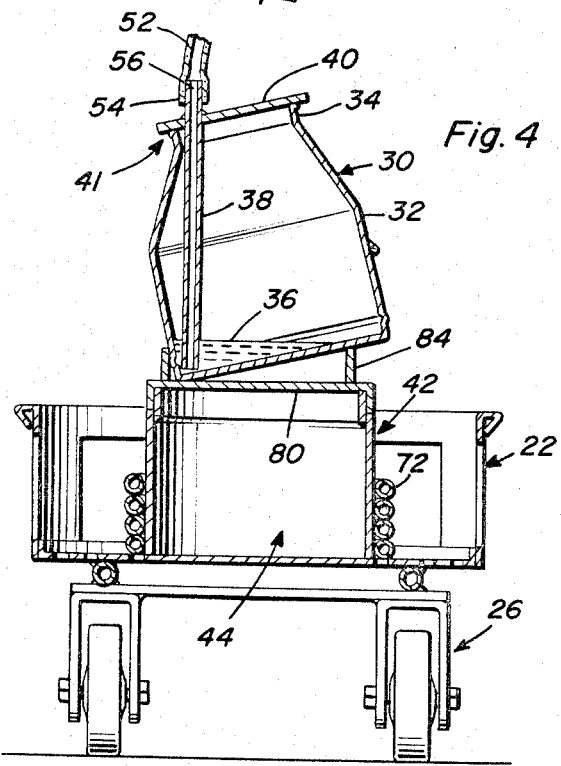
FIG. 4 is a section at right angles on the vertical section line 4—4 of FIG. 3.

With reference now to FIGS. 1, 2, 3 and 4, particularly FIG. 1, the numeral 8 designates the aforementioned stanchion barn having partitions 10 therein defining individual cow-containing stalls 12. The floor of the central aisle between the stalls is denoted at 14. The numeral 16 designates suitably suspended hose supporting hooks 16 which serve in a manner to be described. The milk house is denoted at 18 and is provided therewith a milk-receiving and cooling vat or tank 20. All of these features being old, they are diagrammatically shown. The featured invention has to do with the self-contained walking attendant steered and controlled means that is the truck or cart illustrated advantageously in FIGS. 2, 3 and 4. This cart comprises a tray-type body 22 provided with front wheels 24 suitably bracketed in place and rear steering wheels or casters 26 which are also appropriately constructed and mounted. The handle means 28 is attached to the trailing end and is constructed and arranged for one-handed control. This enables the attendant to push and pull the cart in relation to the surface of the aisle and the open ends of the cow-containing stalls. The numeral 30 designates a conventional milking bucket which has a body portion 32, a neck or mouth 34 and which, as shown in FIG. 4, contains milk 36. It is to be stressed that this is a conventional milking bucket and that it is the chief objective to pick up and transfer the milk directly from this bucket by way of a motorized pump to the milk house, that is the cooling tank in the milk house. To the ends desired, a suitable nipple 38 is attached to and eccentrically mounted on a simple disk-like lid or cover 40 which in practice rests atop the neck of the milk bucket in the manner shown in FIG. 4. The weight and character of the lid is such that atmospheric venting air can enter as at 41.

Figures 5, 6:
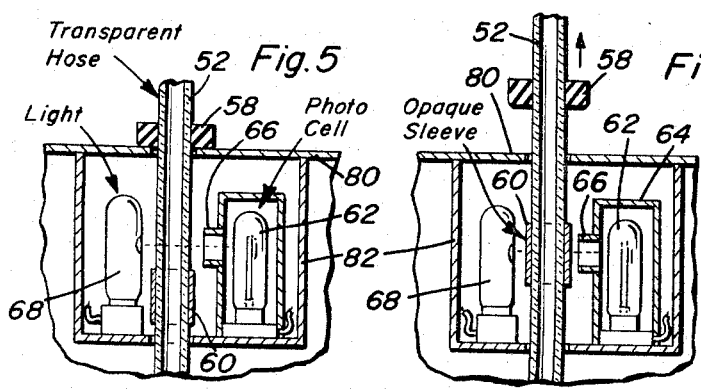
FIG. 5 is a detail section with parts in section and elevation showing the photocell, lamp bulb and transparent hose with these components amply shown to illustrate the operating principle, that is, the turning off and on of the motorized pump.
FIG. 6 is an enlarged view taken approximately on the plane of the line 6—6 of FIG. 3 and which shows the nontransparent or light-blocking sleeve in a position between the lamp and window of the photoelectric cell which is the position necessary to start the motor and pump.
Figure 3:
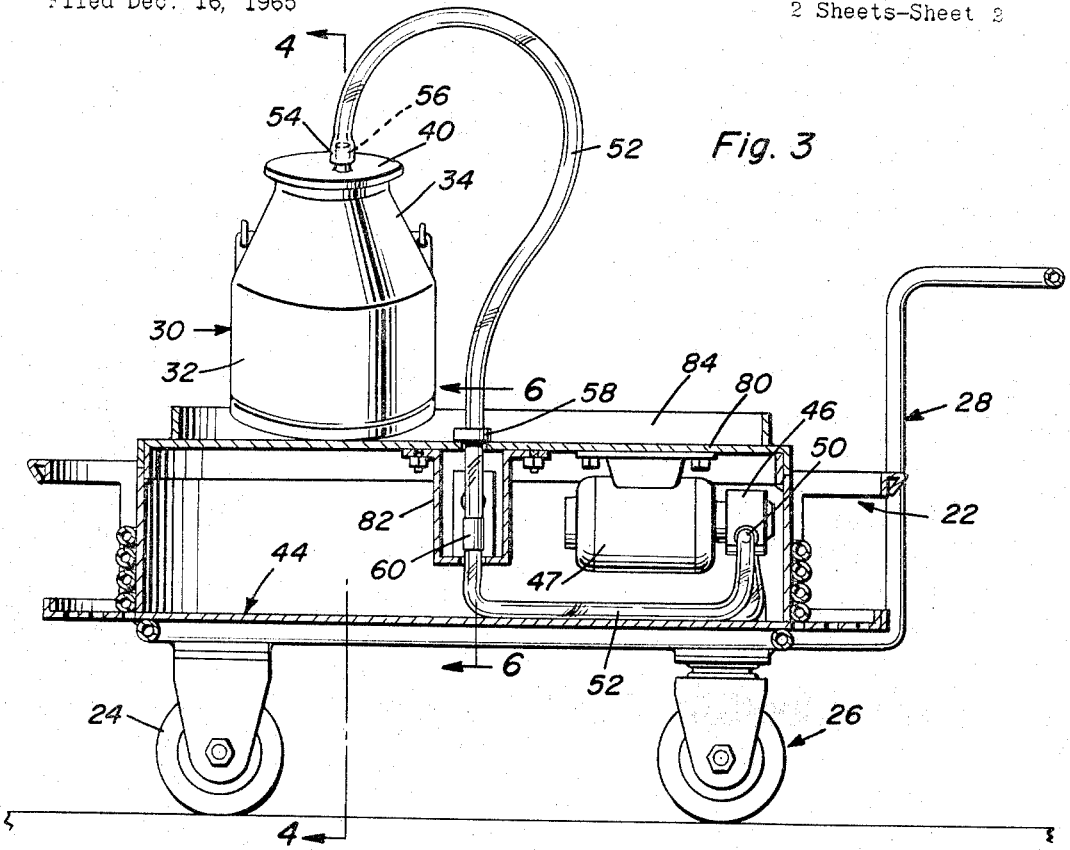
FIG. 3 is a view with parts in section and elevation taken on the plane of the line 3—3 of FIG. 2.

In use this bucket 30 (also each bucket which is successively removed from each stall 12 and brought into play) is mounted removably for use on support means provided therefor in the tray or body portion of the cart. This is best achieved by providing an elongate housing 42. This housing is hollow and the hollow portion 44 serves to accommodate a self-priming centrifugal pump 46 operated by the unified suspended motor 47. This pump (not detailed) is provided on one side with an inlet neck 48 (FIG. 2) to which an end 50 of a relatively short milk-feeding transparent hose 52 is connected. The other end portion 54 of the hose is communicatively connected with an upwardly projecting end portion of the aforementioned nipple 38, that is the portion 56 as shown in FIG. 7. An intermediate portion of this hose is provided with a stop washer 58 which serves a purpose to be later described. Then, too, there is a short nontransparent light beam blocking sleeve 60 mounted on a portion of the hose. This shouldered sleeve-equipped portion of the hose is slidingly and liftably mounted in the manner shown in FIGS. 5 and 6. A photoelectric cell 62 is provided and enclosed in a jacket 64 having a window 66 at one side. This window is aligned and registrable with a coacting suitably supported lamp bulb 68. The opaque sleeve 60 is adapted to be moved into alignment or registry with the window 66 or out of registry therewith as shown in FIGS. 5 and 6, respectively. Consequently, this hose from the bucket serves not only to pick up and deliver the milk to the pump 46, it provides a manually liftable and lowerable circuit make-and-break switch for the motor 47. This is to say, the motor can be turned off and on and the pump operated accordingly. The companion or second hose, which is much longer than the bucket unloading pump feeding hose 52 and is denoted at 72, has one end portion 74 (FIG. 2) connected with the neck 76 on the discharge side of the pump. The discharge end portion 78 of the hose 72 is intended in practice to be aligned with the cooling tank 20 in the milk house 18. The median portion of the hose 72 between these two ends is elevated and suitably suspended from the aforementioned hanger hooks 16.

With further reference to the enclosing housing 42 it will be noted that this housing is not only ovate and elongated so that it serves as a coiling and storing drum for the milk conducting hose line 72, it is provided with a removable top wall 80 which serves as a closure. This closure supports the motor 47 which is hung therefrom and the motor in turn supports the pump 46. This cover also supports a depending secondary enclosure 82 which encloses the slidably mounted portion of the hose, that is the first-named feeding hose 52 and also supports the photocell jacket 64 and lamp 68 (FIGS. 5 and 6). Furthermore, this cover 80 is provided on its top surface with an elongated upstanding rim 84 which serves as a positioning and holding rack for the readily applicable and removable milk-containing bucket 30. It should be noted that this rim is of a limited vertical height (FIG. 4) so that a major bottom portion of the bucket is tiltably inclined and held therein as shown. A portion of the bucket rests atop the upper edge of the rim so that in this manner the bucket is tiltingly held and consequently when the lid 40 is applied and the nipple 38 is inserted into the milk in the bucket, the structure is ready for controlled operation. When the milk-laden bucket is removed from a stall it is simply placed atop the top wall 80 of the housing 42 in the manner shown in FIGS. 1–4 inclusive. The lid 40 is applied and the nipple 38 is suspended in the milk. The user catches hold of the hose 52 and lifts up on it and elevates the stop collar or washer 58 (FIG. 6). This brings the opaque sleeve in line with the window 66 and light beam from the bulb and interrupts the light beam. This particular step starts the motor and consequently the pump 47. The milk is now sucked up through the nipple and into the hose 52 and the pump 46, that is after the hose has been dropped down to the position shown at the left in FIG. 5. So long as the milk is flowing through the transparent hose 52 the photoelectric cell 62 keeps the motor 47 running. When all of the milk has been sucked from the bucket and the hose 52 is clear the beam of light shines through the window 66, acts on the photoelectric cell and stops the motor and the pump.

It is believed that a careful consideration of the specification in conjunction with the views of the drawing will enable the reader to obtain a clear and comprehensive understanding of the subject matter of the invention, the features and advantages and mode of use. Accordingly, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in collecting milk from an area within the confines of a milking parlor in a stanchion barn having a centered lengthwise aisle between open-ended cow-containing stalls positioned to the left and right of the center of said aisles; portable self-contained means for picking up and conveying the warm milk directly from a first milk-loaded bucket in line, if desired, with a first selected stall, a second loaded bucket substantially in line with a second stall and proceeding likewise from stall to stall until all of the milk-filled buckets have been sequentially handled and emptied, said means characterized by a mobile attendant steered and handled cart, a motor powered self-priming centrifugal pump having a suction-type intake neck on one side and a pressurized milk outflow and discharge neck on an opposite side, a first flexible milk conveying hose with one end communicatively joined to said neck and the other end communicatable with a remote milk room cooling and storage tank, said cart having a self-contained support for said milk buckets as they are brought into play and removed, a milk pick-up and pump feeding second hose complemental to said first hose and having one end communicatively connected to said intake neck, the other end being free and provided with a suction controlled pick-up nipple insertable into the milk in said bucket, and means for switching said motor and pump on while emptying said bucket, and off when the bucket has been emptied and subsequently replaced with the second bucket and until all milk-filled buckets have been unloaded, said switching means comprising a photoelectric cell electrically connected to said motor, a constantly "on" light bulb proximal to and cooperable with said cell and functionally automatically acting on said cell to turn the motor "on" as soon as the nipple placed in the milk laden bucket and to likewise turn the motor off as soon as, or approximately so, the bucket is emptied, said cell enclosed in a jacket with a window exposing the cell, said bulb opposed to but spaced from said cell, said second hose being made of transparent plastic and having a portion controllably interposed in a space prepared therefor between said cell and bulb in a manner that when milk is flowing through said hose the cell functions to keep the motor and pump running and, when the flow stops, the motor stops and the pump stops.

2. The structure according to claim 1, and wherein said cart comprises a wheel supported body having a push-pull handle at the rearward end capable of one-handed operation and control, a hollow housing carried by said body, said motor and pump being located and normally confined in the hollow space of said housing, said housing having a top for receptive and temporary retentive support of said milk bucket.

3. The structure according to claim 2, and wherein said housing is elongated with rounded ends, the exterior vertical walls of said housing being suitably smooth whereby said housing is not only an enclosure for the motor and pump but is of a height and an area that it provides a stationary drum on which said first hose can be coiled and compactly stored when it is wholly or partly out of use.

4. The structure defined in claim 3, and wherein the top of said housing comprises a platform, and in combination a milk-filled conventional-type bucket, supported accessibly atop said top.

5. The structure according to claim 4, and wherein said nipple is adapted to depend into the receptacle portion of said bucket, said nipple provided at its upper end with a simple disk-like lid, said lid, when in use, being seated on and closing the usual neck of said bucket.

6. The structure according to claim 5, and wherein said top is removably mounted on and closes the open top of said housing, said top having an exterior upstanding ovate rim defining a seating tray for the bottom of said bucket.

7. The structure according to claim 6, and wherein said rim is of limited vertical height and also of a crosswise width less than the diameter of the bottom of said bucket, whereby the bucket can be placed in a canted position relative to the horizontality of said top and verticality of said rim in a manner to facilitate sucking all of the milk from said bucket as it is being emptied.

8. The structure according to claim 1 and wherein the aforementioned interposed portion of said hose is provided along a minimal portion thereof with a nontransparent hose encircling sleeve, said sleeve constituting a light beam blocking blind, said sleeve equipped portion of the hose being slidingly mounted and operating through guides provided therefor and having a limit stop cooperable with the aforementioned top, that portion of the hose above the stop and which is manually handled, being capable of being lifted up in a manner to bring the sleeve in line with the window to momentarily block the light beam from the bulk and in this manner to cause the photocell to start the motor, after which the sleeve is allowed to drop to a position bringing the bulb and cell and window into cooperating relationship and, whereby so long as the milk is flowing through said hose the light beam is blocked and as soon as the hose is cleared the light beam becomes effective in a manner to activate said cell.

References Cited
UNITED STATES PATENTS

| | | | |
|---|---|---|---|
| 2,657,700 | 11/1953 | Ray | 139—93 |
| 3,053,225 | 9/1962 | Babson | 119—14.11 X |
| 3,144,041 | 8/1964 | Werner et al. | 119—14.11 X |
| 3,168,994 | 2/1965 | Grise | 119—14.11 X |
| 3,198,122 | 8/1965 | Lippke et al. | 103—25 |
| 3,224,460 | 12/1965 | Cann | 137—205 X |
| 3,279,431 | 10/1966 | Simons | 119—14.08 |
| 3,285,297 | 11/1966 | Duft et al. | 119—14.11 X |
| 3,292,580 | 12/1966 | Merritt et al. | 119—14.46 |

ALDRICH F. MEDBERY, *Primary Examiner.*